United States Patent
Cumpson (10) Patent No.: US 6,754,034 B2
(45) Date of Patent: Jun. 22, 2004

(54) SYSTEM FOR RECORDING AND/OR REPRODUCING INFORMATION, MAGNETIC WRITE HEAD FOR USE IN THE SYSTEM, MAGNETIC TAPE FOR USE IN THE SYSTEM, CASSETTE FOR USE IN THE SYSTEM, AND ARRANGEMENT FOR FORMATTING THE MAGNETIC TAPE

(75) Inventor: Stephen Rodney Cumpson, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 444 days.

(21) Appl. No.: 09/739,498

(22) Filed: Dec. 18, 2000

(65) Prior Publication Data

US 2001/0040753 A1 Nov. 15, 2001

(30) Foreign Application Priority Data

Dec. 21, 1999 (EP) .............................. 99204454

(51) Int. Cl.$^7$ .............................................. G11B 5/596
(52) U.S. Cl. .................................................. 360/77.12
(58) Field of Search ............................. 360/77.08, 18, 360/75, 51, 57, 77.12, 48

(56) References Cited

U.S. PATENT DOCUMENTS

| | | |
|---|---|---|
| 5,805,372 A | 9/1998 | Hoogendoorn et al. .. 360/77.01 |
| 5,912,778 A * | 6/1999 | Kalfs et al. .................... 360/48 |
| 5,933,290 A | 8/1999 | Hoogen-Doorn et al. 360/78.12 |
| 5,966,276 A | 10/1999 | Draaisma et al. ........... 360/121 |
| 5,982,591 A | 11/1999 | Folkerts et al. ............. 360/121 |
| 6,061,196 A | 5/2000 | Kalfs et al. .................... 360/48 |
| 6,097,571 A | 8/2000 | Draaisma et al. ........... 360/125 |
| 6,134,070 A * | 10/2000 | Tran et al. ..................... 360/75 |

FOREIGN PATENT DOCUMENTS

| | | | |
|---|---|---|---|
| WO | WO9630897 | 10/1996 | ........... G11B/5/265 |
| WO | WO9717699 | 5/1997 | ........... G11B/5/584 |
| WO | WO9719446 | 5/1997 | ........... G11B/20/12 |
| WO | WO9721213 | 6/1997 | ........... G11B/5/584 |
| WO | WO9733274 | 9/1997 | ........... G11B/5/265 |
| WO | WO9826410 | 6/1998 | ........... G11B/5/265 |

* cited by examiner

Primary Examiner—David Hudspeth
Assistant Examiner—K. Wong (57) ABSTRACT

A system for recording and/or reproducing information, including a magnetic tape formatted by a magnetic write head which is movable in a longitudinal direction (x) and which forms "buried" servo tracks of different widths. The amplitude of the servo read signals, as a function of the position of the magnetic read/write head of the apparatus with respect to the "buried" servo tracks of the magnetic tape in the width direction (y), is substantially the same for the all the read/write units of the read/write head in spite of the width differences.

10 Claims, 4 Drawing Sheets

SYSTEM FOR RECORDING AND/OR REPRODUCING INFORMATION, MAGNETIC WRITE HEAD FOR USE IN THE SYSTEM, MAGNETIC TAPE FOR USE IN THE SYSTEM, CASSETTE FOR USE IN THE SYSTEM, AND ARRANGEMENT FOR FORMATTING THE MAGNETIC TAPE

BACKGROUND OF THE INVENTION

1. Field of the Invention

The invention relates to a system for recording and/or reproducing information, comprising a magnetic tape formatted with the aid of a magnetic write head, said magnetic tape being movable in a longitudinal direction (x) with respect to said magnetic write head, and including an apparatus having a magnetic read/write head having magnetic read/write units for writing data tracks into a magnetic tape movable in a longitudinal direction (x) with respect thereto, said read/write head being movable in a width direction (y) with respect to the longitudinal direction (x) of the magnetic tape by means of an actuator, the magnetic tape being previously provided with a pattern of buried servo tracks (STn) by the write head, said buried servo tracks extending in the longitudinal direction (x) and alternately containing a different servo signal, said buried servo tracks including at least one group of juxtaposed servo tracks of a width (w1), and at least one servo track of greater width, said apparatus further including control means for controlling the actuator by means of a control signal, said control means receiving servo read signals originating from servo signals embedded in adjacent servo tracks and read by the read/write units of said magnetic read/write head, and processing said servo read signals in a processing unit so as to form said control signal for the actuator, to a magnetic write head, to a magnetic tape provided with a pattern of buried servo tracks, comprising buried servo tracks of a first type containing a first servo signal (Sa), and buried servo tracks of a second type containing a second servo signal (Sb), said servo tracks extending substantially in a longitudinal direction (x), and said track pattern, in a transverse direction (y) perpendicular to the longitudinal direction (x), alternately comprising a servo track of the first type and a servo track of the second type, at least one group of servo tracks having a width w1 and at least one servo track having a greater width, said magnetic tape being able to cooperate with a magnetic read/write head of a given type is movable by an actuator in a width direction (y) with respect to the longitudinal direction (x) of the magnetic tape, as well as to an arrangement for formatting a magnetic tape including a magnetic write head and means for scanning a magnetic tape by means of the magnetic write head, in which the write head has a head face having a longitudinal direction (x) which corresponds to the longitudinal direction of movement of a magnetic tape with respect to the write head, and a width direction (y) which is perpendicular to the longitudinal direction and extends parallel to a generatrix of the head face, a structure of integrated write units has been provided in the write head, the write units being juxtaposed and extending in the width direction (y), and each of the write units having at least one write gap terminating in the head face and having a dimension in the width direction, said dimension corresponding to the width of the corresponding servo track, and at least one group of juxtaposed write units of a width w1 being provided and at least one write unit of greater width being provided.

2. Description of the Related Art

Such a system, such a magnetic write head, such a magnetic tape, such a cassette and such an arrangement are known from International Patent Application No. WO 98/26410, corresponding to U.S. Pat. Nos. 5,912,778 and 6,061,196, the subject matter of which, insofar as it is relevant to the present Application, is incorporated in the present Application by reference. other publications which are of relevance to the present Application are International Patent Application Nos. WO 96/30897 (corresponding to U.S. Pat. Nos. 5,966,276 and 6,097,571), WO 97/17699, WO 97/19446 (corresponding to U.S. Pat. No. 5,933,290), WO 97/21213 (corresponding to U.S. Pat. No. 5,805,372), and WO 97/33274 (U.S. Pat. No. 5,982,591). All said publications, insofar as relevant hereto, are incorporated in the present description by reference.

The known system, the known magnetic tape, the known magnetic write head, the known cassette and the known arrangement, make it possible to position the magnetic read/write head with a high accuracy with respect to the pattern of data tracks on the magnetic tape. This enables information to be read from and written into the pattern of data tracks during the movement of the magnetic tape in the one direction and in the reverse other direction. The described system enables the information to be read from and written into the pattern of data tracks while the servo tracks are read and the magnetic read/write head is controlled on the basis of the scanned servo signals, as a result of which, the position signal is immune to tolerances in the width of the servo track. This immunity is obtained, inter alia, in that always at least two magnetic read/write units are situated on the boundary between two adjacent servo tracks, and in that these read/write units read a servo track of the same type by means of facing parts and read a servo track of the other type by means of parts which are remote from one another. The above-mentioned tolerances influence the signals read by these read/write units to the same degree, as a result of which, the tolerances in the actuator drive cancel one another because this drive is based on the difference between the signals read by the relevant read/write units.

It has been found that the format of the inscribed servo signals gives rise to unequal amplitudes of the signals read from the servo tracks having a width larger than the data tracks. This reduces the overall signal-to-noise ratio of the servo system and may lead to an undesired degree of limitation of the track density. The reason for this is that the read/write units of the read/write head appear to be sensitive not only to the parts of the servo tracks situated directly beneath the active part of the read/write units, but also to those parts of the servo tracks which extend adjacent the active party of the read/write units. As a consequence, the servo tracks of larger width are read with a greater amplitude than the other servo tracks. This has a negative effect on the servo control of the read/write head. A reason for this is that the asymmetry of the servo signal thus read causes a reduction of the accuracy of the analog/digital conversion of the servo signal read.

SUMMARY OF THE INVENTION

It is an object of the invention to provide a system as described above, which does not have said drawbacks. The system in accordance with the invention, is characterized in that the amplitude of the servo read signal as a function of the position of the magnetic read/write head of the apparatus with respect to the magnetic tape in the width direction (y) is substantially equal for all the read/write units of the read/write head. The aforementioned undesired reduction of the signal-to-noise ratio of the servo system is avoided in that the amplitude of the servo read signals as a function of the position of a magnetic read/write head of the apparatus is substantially constant.

In one embodiment of the invention, care is taken that the servo tracks of greater width induce a signal into the relevant read/write units with an amplitude which is the same as that of the servo signals for the other read/write units.

In a preferred embodiment of the present invention, the servo signals in the embedded servo tracks of greater width are given a suitable effective value by dividing the servo track into a plurality of signal-carrying sub-tracks alternating with one or more empty sub-tracks.

A magnetic write head, in accordance with the invention, is adapted to format magnetic tapes which are suitable for the system described above, which has signal-carrying sub-tracks and or more empty sub-tracks.

In an embodiment of write heads according to the invention, the write heads can be manufactured with the aid of a so-called thin-film technology.

The magnetic tape in accordance with the invention has been pre-formatted in such a manner that during cooperation with a magnetic read/write head of the system, the servo read signals obtained from the various servo tracks, including those from the broader servo tracks, have substantially equal amplitudes.

This can be achieved, for example, by recording a servo signal of smaller amplitude in the broader servo tracks. It is also possible to use a magnetic tape where the servo tracks of greater width have been divided into one or more signal-carrying tracks and one or more empty servo tracks.

In a further embodiment of the invention, the magnetic tape can be accommodated in a cassette.

A further embodiment of the invention offers an arrangement for formatting a magnetic tape for use in the system in accordance with the invention, which utilizes a magnetic write head in the preferred embodiment mentioned hereinbefore for writing a sub-set of tracks comprising one or more signal-carrying sub-tracks and one or more empty sub-tracks.

BRIEF DESCRIPTION OF THE DRAWINGS

The invention will be now described in more detail, by way of example, with reference to the drawings, in which.

DESCRIPTION OF THE PREFERRED EMBODIMENTS

Figure 1:
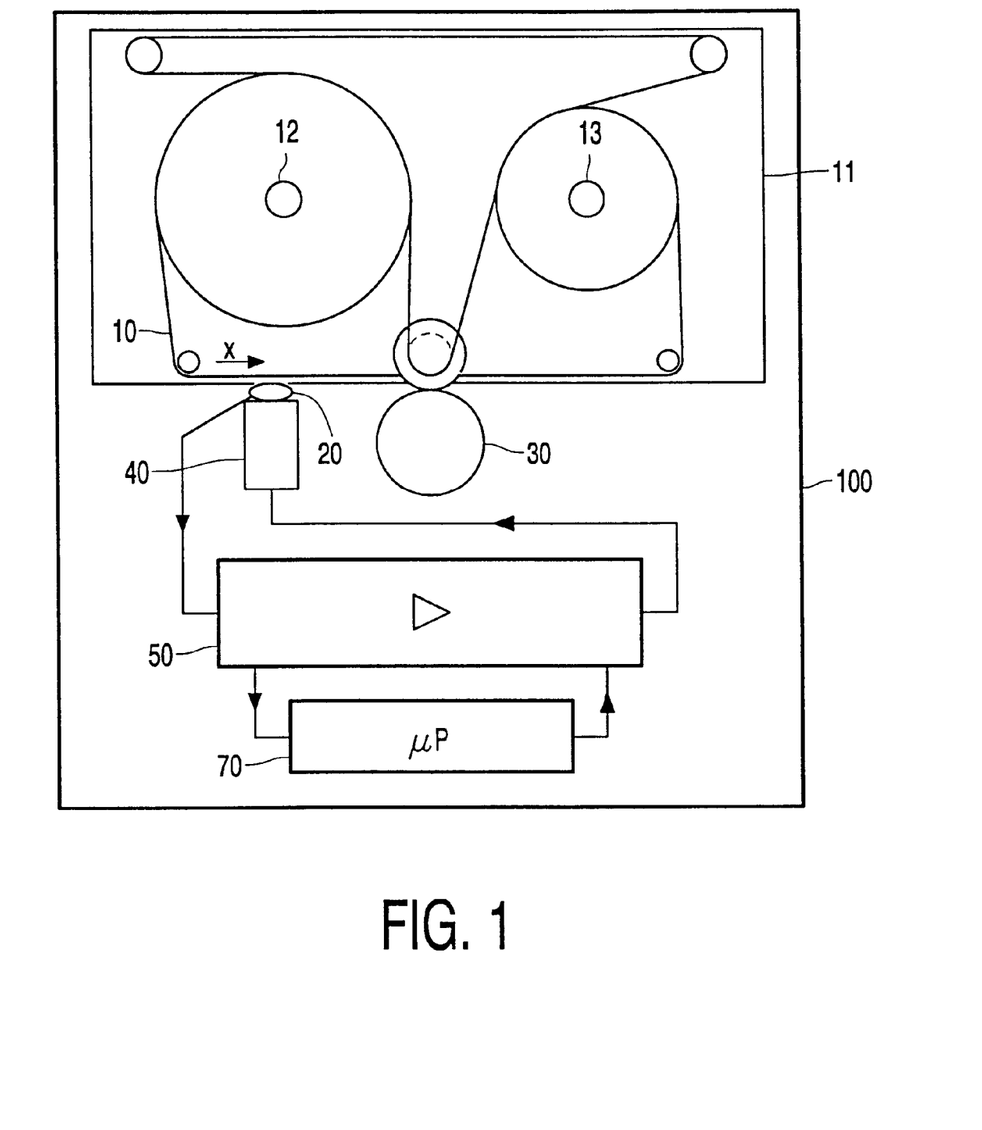
FIG. 1 shows, diagrammatically, a system in accordance with the prior art and in accordance with the invention.

FIG. 1 shows, diagrammatically, a system in accordance with the invention of the type described previously in the aforementioned document WO 98/26410. The system includes an apparatus 100 and a magnetizable medium, in the present case, a magnetic tape 10 accommodated in a housing in the form of a cassette 11. The magnetic tape 10 has been provided with a pattern of servo tracks in which servo signals are stored in the form of a magnetization pattern recorded at a deep level (see FIG. 2). These deep servo tracks are referred to as "buried" servo tracks. The apparatus 100 comprises a magnetic head unit 20 and means, in the present case, a motor 30, for the relative movement of the magnetic tape 10 with respect to the magnetic head unit 20 in a longitudinal direction x along the servo tracks (see FIG. 2). The apparatus 100 further comprises an actuator 40, for moving the magnetic head unit 20 transversely to the servo tracks, and a servo circuit 50, arranged between the magnetic head unit 20 and the actuator 40. The apparatus 100 comprises control means, in the present case, a microcomputer 70, for controlling the actuator 40 and the magnetic head unit 20.

Figure 2:
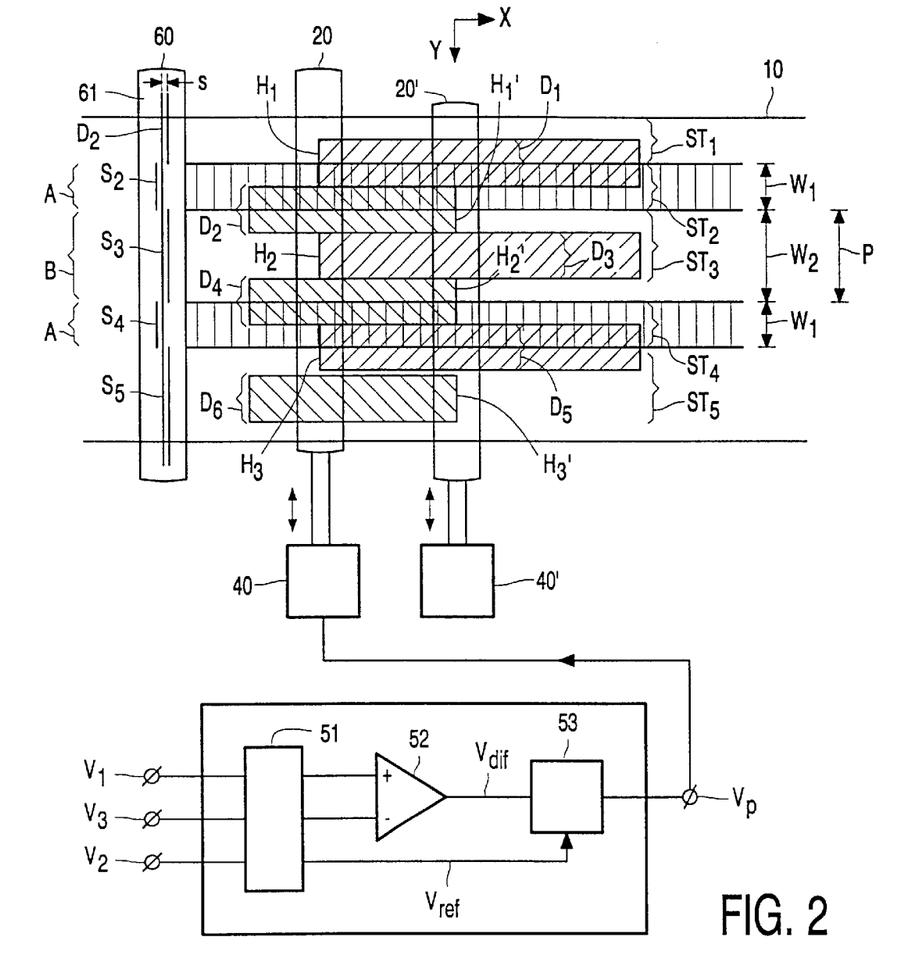
FIG. 2 shows a write head, a magnetic head unit, an actuator and a first embodiment of the medium in accordance with the prior art.
Figure 3:
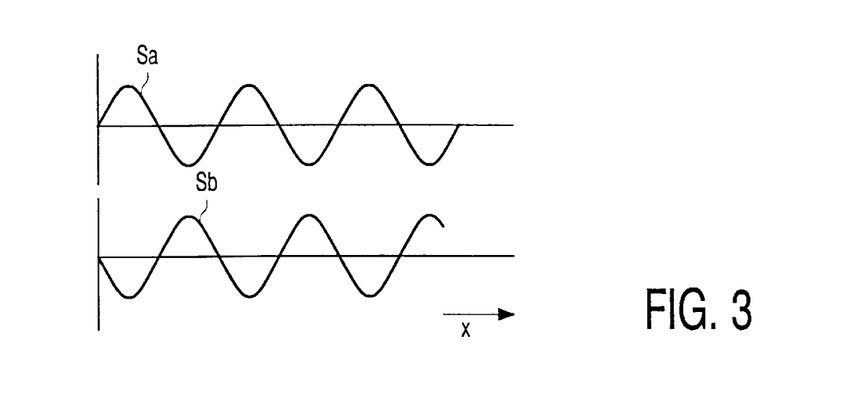
FIG. 3 shows two servo signals and their phase relationship to one another.

FIG. 2 shows, diagrammatically, a magnetizable medium in the form of the magnetic tape 10, a write head 60, the magnetic head unit 20 and the actuator 40. The magnetic tape 10 has been provided with a pattern of servo tracks ST1–ST5 which extend in a longitudinal direction x and which adjoin one another in a transverse direction y which is perpendicular to the longitudinal x. The servo tracks ST1, ST3 and ST5 are of a first type containing a servo signal Sa and the servo tracks ST2 and ST4 are of a second type containing a servo signal Sb. The servo signals Sa and Sb each contain a fundamental of the same frequency but are in phase opposition to one another (see FIG. 3). The servo signals have been recorded by means of the write head 60 having a comparatively large gap length s. As a result of this, the servo signals are stored deep into the magnetic tape 10. The magnetic head 60 has a head face 61 and a structure of integrated write units S1–S5, this structure terminating in the head face 61, these write units being disposed adjacent one another, extending substantially in the transverse direction and each having a write gap. The structure comprises a group of two write units S2 and S4 of a first type A, which are separated by a write unit S3 of a second type B. The write units S2 and S4 of the first type A have a first typical width W1 and the write unit S3 of the second type B has a second typical width $W2=2 \cdot W1$. By means of this write head 60, the track pattern ST1–ST5 is written onto the magnetic tape 10 in a single pass. This writing is preferably effected in an apparatus to be described hereinafter and specially designed for this purpose, during the manufacture of the magnetic tape or during loading of the magnetic tape 10 into the cassette 11 (see FIG. 1).

The magnetic head unit 20 forms part of the apparatus 100 as shown in FIG. 1, and has three magnetic heads H1, H2 and H3 capable of reading and writing simultaneously. The apparatus 100, as shown in FIG. 1, is adapted to write information signals into information tracks D1–D6. For positioning the magnetic head unit 20 during writing and/or reading of the information tracks D1–D6, the apparatus 100 has an actuator 40 and a servo circuit 50. The servo circuit 50 is electrically arranged between the magnetic head unit 20 and the actuator 40 and is adapted to position the magnetic head unit 20 with respect to the track pattern ST1–ST5 in response to the servo signals V1, V2 and V3 read from the servo tracks by the heads H1, H2 and H3, respectively. The servo circuit 50 has a selector 51 for selecting the signals received from heads disposed on a boundary line between two servo tracks, and a comparator 52 for generating a difference signal Vdif from the selected signals. The selector 51 is controlled by the microcontroller 70 shown in FIG. 1. The servo circuit 50 further comprises a multiplier 53 for generating a position signal Vp for driving the actuator 40, this position signal being obtained by multiplying the difference signal Vdif and a reference signal Vref obtained from the head which is disposed on one of the servo tracks. The actuator 40 is driven until the position signal Vp is substantially equal to zero. Depending on the pass, the reference signal Vref and the difference signal Vdif are formed as follows by means of the selector 51:

| Pass | Vref | Vdif |
| --- | --- | --- |
| 1 | V2 | V1 − V3 |
| 2 | V3 | V2 − V1 |

The center-to-center distance p between the magnetic heads H1, H2 and H3 is equal to twice the typical width W1 of the servo tracks ST2 and ST4. As a result of this, two passes are needed to provide the magnetic tape 10 wholly with information tracks D1–D6. In a first pass, the magnetic head unit 20 writes the information tracks D1, D3 and D5, the magnetic tape 10 being moved in the direction x with respect to the magnetic head unit 20. In a second pass, the same magnetic head unit, now referenced 20', writes the information tracks D2, D4 and D6 at another position in the transverse direction y, the magnetic tape 10 being moved in a direction opposite to the direction x with respect to the magnetic head unit 20'. After these two passes, the magnetic tape 10 has resumed its initial position.

Figure 4:
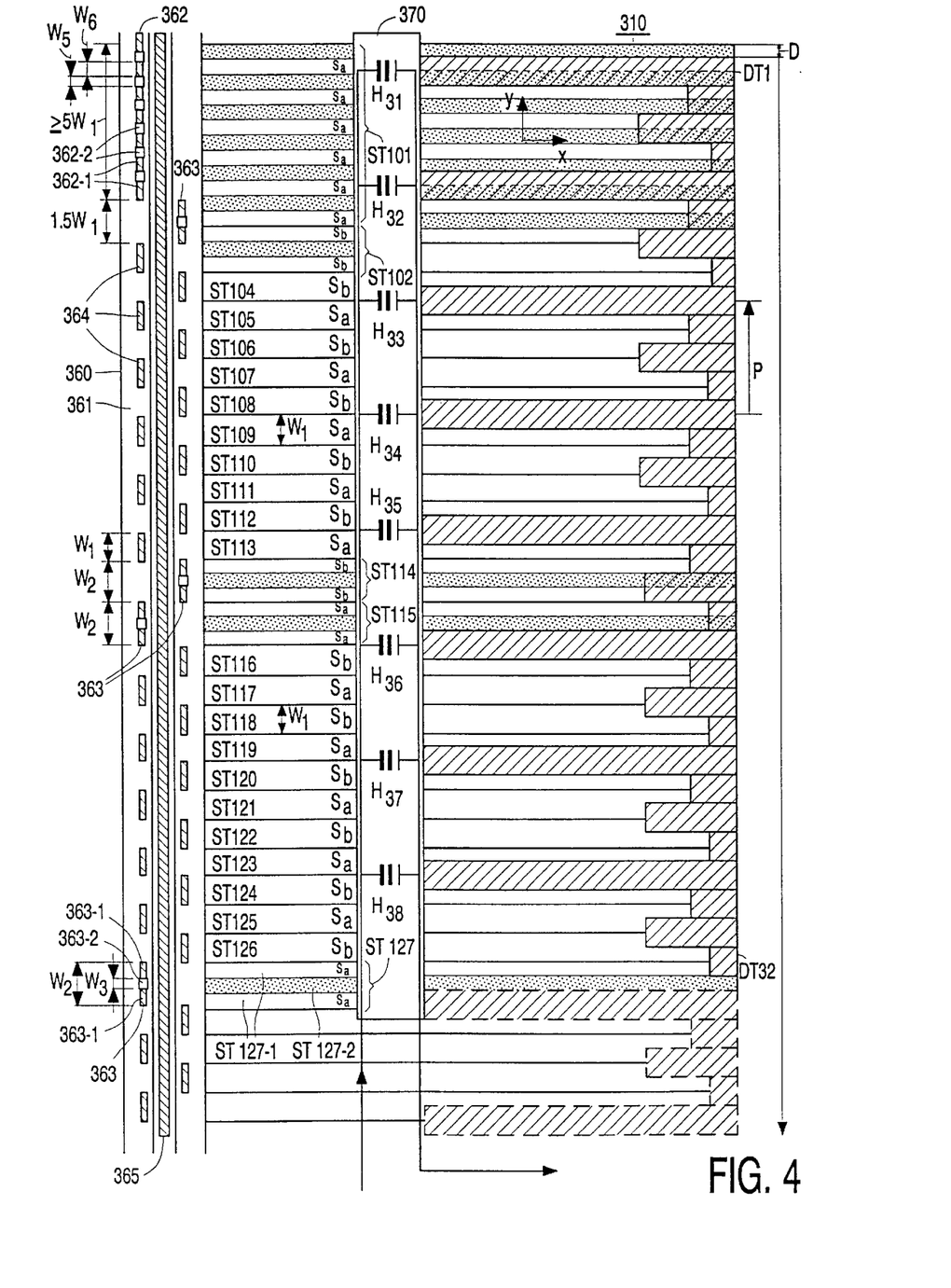
FIG. 4 shows, diagrammatically, an embodiment of the medium in accordance with the invention, a part of a write head for writing the servo tracks, and a read/write head having eight read/write units.

FIG. 4 shows, diagrammatically, a part of an embodiment of the medium in accordance with the invention, and a part of a magnetic write head in accordance with the invention for writing the servo tracks. By means of the write head 360, the magnetic tape 310 has been provided with a pattern of servo tracks ST101–ST127 which extend in a longitudinal direction x. The odd-numbered servo tracks contain a servo signal Sa and the even-numbered servo tracks contain a servo signal Sb. The servo signals Sa and Sb each contain a fundamental of the same frequency but are in phase opposition to one another (see FIG. 3). The servo tracks ST103–ST113 and ST116–ST126 have a typical width W1 and form a group of two bands separated by a band with the servo tracks ST114 and ST115 having a typical width of W2=1.5·W1. The magnetic tape 310 is adapted to cooperate with an apparatus having a magnetic read/write head 370 with read/write head units H31–H38. The center-to-center distance p between the read/write head units H31–H38 is equal to four times the typical width W1. As a result, four passes are needed to fill the track pattern ST101–127 with information tracks DT1–DT32 in a manner comparable to that described with reference to FIG. 2. After these four passes, the magnetic tape 310 has again reached its initial position. Depending on the pass, the reference signal Vref and the difference signal Vdif are formed as follows by the selector 51:

| Pass | Vref | Vdif |
| --- | --- | --- |
| 1 | H31 + H32 | (H33 + H34 + H35) − (H36 + H37 + H38) |
| 2 | H31 − H32 | (H33 + H34 + H35) − (H36 + H37 + H38) |
| 3 | H31 − H35 | (H32 + H33 + H34) − (H36 + H37 + H38) |
| 4 | H31 + H35 | (H32 + H33 + H34) − (H36 + H37 + H38) |

FIG. 4 also illustrates the measures which are characteristic of the invention. According thereto, the servo tracks of greater width at the upper edge of the magnetic tape 310, ST114, ST115 and ST127 are such that the amplitude of the servo read signals read by the relevant read/write units of the read/write head 370 of the apparatus with respect to the magnetic tape in the width direction y is substantially equal for all the read/write head units H31–H38 of the read/write head 370. In the present read/write head 370, all the read/write head units H31–H38 have the same read/write characteristics. Steps have been taken to achieve that each buried servo track of greater width, ST101, ST114, ST115 and ST127, contains a servo signal having an effective value adapted to the read/write characteristics of the read/write head units H31–H38 and to the effective value of the servo signals in the servo tracks of the width W1. For this purpose, the embodiment of the invention shown in FIG. 4 employs a characteristic feature which, for the sake of simplicity, will be described primarily with reference to the servo track ST127 of the width W, but which also applies to the other servo tracks of greater width ST101, ST114 and ST115.

In accordance with this characteristic feature, the servo track of greater width ST127 consists, in total, of a set of three sub-tracks, namely, two sub-tracks ST127-1 and a central sub-track ST127-2. This last-mentioned track is disposed in the center, so that the two tracks ST127-1 have the same width. The two sub-tracks ST127-1 are signal-carrying and the sub-track ST127-2 is an empty sub-track. The fact that the sub-track ST127-2 is empty, i.e., does not have a "buried" servo signal, is symbolized in the drawing in that this empty servo track has been marked with a dot pattern. Also, in the case of the servo tracks of greater width ST101, ST114 and ST115, each empty sub-track is marked with a dot pattern. For the signal-carrying sub-tracks ST127-1, a servo signal Sa of equal amplitude and phase has been provided. As already stated hereinbefore, the servo signals in the servo tracks, in turn, comprise a servo signal Sa and a servo signal Sb, which are essentially formed by sinusoidal signals of the same frequency but of opposite phase (see FIG. 3).

The write head 360 has a head face 361 with a longitudinal direction x which corresponds to the longitudinal direction of the movement of the magnetic tape with respect to the write head 360 and has a width direction y perpendicular to the longitudinal direction and parallel to a generatrix of the head face. FIG. 4 shows that there is a structure of integrated write units 362, 363 and 364 which are disposed adjacent one another and which extend in the width direction y. The write units 364 have a width W1, the write unit 362 has a width greater than 5W1, and the write units 363 have a width equal to 1.5W1. A common pole 365 terminates in the center of the head face 361 of the write head 360.

The write units 362, 363 and 364 are staggered with respect to said common pole 365 and thus form staggered write gaps whose dimension in the width direction corresponds to the widths just mentioned and to the width of the corresponding servo tracks. The write units provided for the servo tracks of greater pitch ST101, ST114, ST115 and ST127, each comprise a set of write sub-units having a spacing between each pair of adjacent write sub-units, each write sub-unit having the width of a signal-carrying sub-track and the spacing having the width of an empty sub-track. When reference is made to the servo track ST127, it can be seen that the relevant write unit consists of a set of write sub-units 363-1 having a spacing 363-2 between them. Each write sub-unit 363-1 has the width of a signal-carrying sub-track ST127-1 and the spacing 363-2 has the width of the empty sub-track 127-2. Thus, only the write sub-units 363-1 are actively involved in writing a servo sub-track, the spacing 363-2 being formed by a non-active part of the write head 360. The same principles apply to the write units belonging to the servo tracks ST101, ST114 and ST115. Particularly, the servo track ST101 differs, because this servo track consists of a set of six signal-carrying sub-tracks and six empty sub-tracks, the write unit 362 consequently also consisting of six active parts and six inactive parts.

With reference to the embodiment shown in FIG. 4, it is to be noted that such an embodiment is suitable for use in a so-called tape streamer for the storage of computer data. For example, the width W1 may then be 18.75 m, the width W2 may be equal to 1.5W1, and the width W3, which is the width of the inactive part 373-2 of the write unit 363, may be 10.125 m. The inactive parts 362-2 of the write unit 362 may have a width of 5 m and the active parts 362-1 may have a width of 13.75 m. It will be obvious that other values may be selected for other uses, the degree to which the effective servo signal read by the different read/write units H31 through H38 of the read/write head complies with the requirements being determined by experiment.

Figure 5:
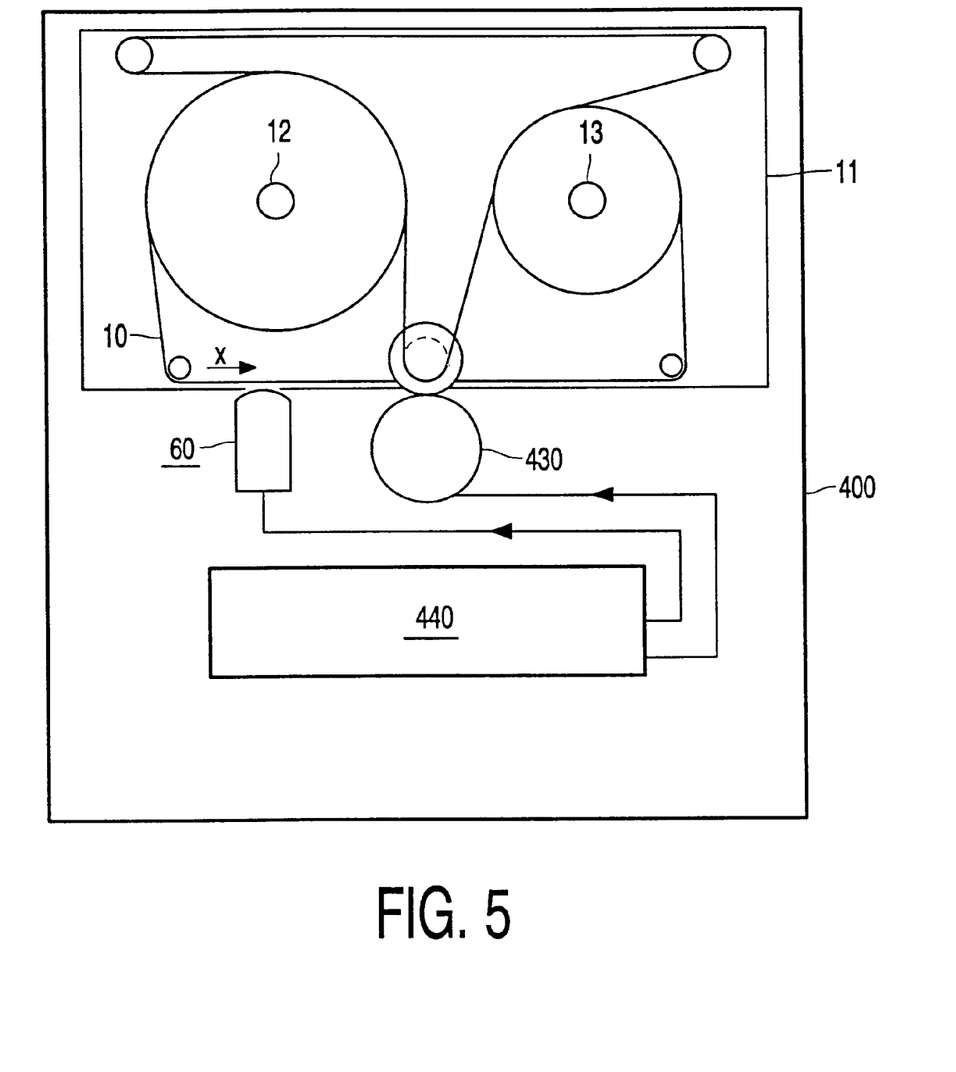
FIG. 5 shows, diagrammatically, an arrangement in accordance with the invention.

FIG. 5 shows an embodiment of the arrangement in accordance with the invention. The arrangement 400 has a compartment for accommodating the cassette 11. The cassette 11 has two reel hubs 12 and 13 onto which a magnetic tape has been wound. The arrangement 400 further includes a write head 60 and a motor 430 for the transport of the magnetic tape 10 past the write head 60 so as to enable recording on the tape 10. The arrangement 100 further includes electronic control means 440 for controlling the write head 60 and the motor 430. By means of this arrangement, it is possible to manufacture a magnetic tape 10 provided with servo tracks as shown in FIG. 4.

It is to be noted that the invention is not limited to the embodiments disclosed herein. Various other embodiments are possible within the scope of the invention. As already stated hereinbefore, it is alternatively possible to use, for example, servo tracks which, instead of consisting of a set of sub-tracks, have been provided with a servo signal of smaller amplitude. In the case of sub-tracks, all the sub-tracks may, in principle, be provided with a servo signal of alternately opposite phase, the widths of the sub-tracks being adapted so as to obtain eventually a net servo signal of the desired amplitude. The servo signals Sa and Sb can be signals of different frequencies, the servo circuit generating a position signal for controlling the actuator in dependence on the amplitude of the servo signals Sa and Sb as read by a number of heads.

What is claimed is:

1. A system for recording and/or reproducing information, comprising a magnetic tape formatted with the aid of a magnetic write head, said magnetic tape being movable in a longitudinal direction (x) with respect to said magnet write head, said system including an apparatus comprising:

a magnetic read/write head having magnetic read/write units for writing data tracks into a magnetic tape movable in a longitudinal direction (x) with respect to said magnetic read/write head;

an actuator for moving said magnetic read/write head in a width direction (y) with respect to the longitudinal direction (x) of the magnetic tape, the magnetic tape being previously provided with a pattern of buried servo tracks (STn) by the magnetic write head, said buried servo tracks extending in the longitudinal direction (x) and alternately containing a different servo signal, said buried servo tracks including at least one group of juxtaposed servo tracks of a width (w1) and at least one servo track of greater width; and control means for generating a control signal for controlling the actuator, said control means receiving servo read signals originating from servo signals embedded in adjacent buried servo tracks and read by the read/write units of said magnetic read/write head, and processing said servo read signals in a processing unit to form said control signal for the actuator, wherein an amplitude of the servo read signal, as a function of a position of the magnetic read/write head with respect to the magnetic tape in the width direction (y), is substantially equal for all the read/write units of the read/write head, wherein each servo track of greater width comprises a set of sub-tracks including a signal-carrying sub-track and empty sub-track, the signal-carrying sub-track extends in the longitudinal direction (x) of the magnetic tape and has a constant width in the width direction (y) of the magnetic tape, the empty sub-track has a constant width and directly adjoins at least one signal-carrying sub-track and extends in the same direction as said at least one signal-carrying sub-track, each of the signal-carrying sub-tracks contains a servo signal of the same amplitude and phase, and each empty sub-track is substantially free from a servo signal.

2. The system as claimed in claim 1, wherein:

each of the read/write units of the read/write head has read/write characteristics, these read/write characteristics being substantially the same for all of the read/write units, and each buried servo track of greater width contains a servo signal having an effective value adapted to the read/write characteristics of the read/write units and to the effective value of the servo signal in the servo tracks of the width (w1).

3. A system as claimed in claim 1, wherein the buried servo signals in the servo tracks alternately consist of a first servo signal and a second servo signal, the first and second servo signals substantially consist of sinusoidal signals of the same frequency but of opposite phase, and the first and second servo signals have amplitudes substantially equal to one another.

4. A magnetic write head for writing buried servo tracks into a magnetic tape, said buried servo tracks extending in longitudinal direction (x) of the magnetic tape and alternately containing a different servo signal, said buried servo tracks including at least one group of juxtaposed servo tracks of a width (w1) and at least one servo track of greater width, each servo track of greater width comprising a set of sub-tracks including a signal-carrying sub-track and empty sub-track, the signal signal-carrying sub-track extending in the longitudinal direction (x) of the magnetic tape and having a constant width in the width direction (y) of the magnetic tape, the empty sub-track having a constant width and directly adjoining at least one signal-carrying sub-track and extending in the same direction as said at least one signal-carrying sub-track, each of the signal-carrying sub-tracks containing a servo signal of the same amplitude and phase, and each empty sub-track being substantially free from a servo signal, said magnetic write head comprising:

- a head face having a longitudinal direction (x) corresponding to the longitudinal direction of movement of a magnetic tape with respect to the write head, and a width direction (y) perpendicular to the longitudinal direction and extending parallel to a generatrix of the head face; and
- a structure of integrated write units, the write units being juxtaposed and extending in the width direction (y),
- each of the write units having at least one write gap terminating in the head face and a dimension in the width direction corresponding to the width of the corresponding servo track, and
- each write unit provided for a servo track of greater width, including a set of write sub-units with a spacing between each pair of adjacent write sub-units, each write sub-unit having the width of a signal-carrying sub-track and the spacing having the width of an empty sub-track.

5. The magnetic write head as claimed in claim 4, wherein
the write gaps of adjacent write units are alternately disposed in one of two mutually parallel planes spaced at a given distance from one another and extending perpendicularly to the head face of the magnetic head, and
the write gaps of the write units extend between a common magnetic pole terminating in the head face and an individual pole terminating in the head face.

6. A magnetic tape provided with a pattern of buried servo tracks, comprising:
- buried servo tracks of a first type containing a first servo signal, and
- buried servo tracks of a second type containing a second servo signal,
- said buried servo tracks extending substantially in a longitudinal direction (x) of the magnetic tape, a track pattern of said buried servo tracks, in a transverse direction (y) perpendicular to the longitudinal direction (x), alternately comprising a buried servo track of the first type and a buried servo track of the second type, said buried servo tracks including at least one group of buried servo tracks having a width w1 and at least one buried servo track of a greater width, said magnetic tape cooperating with a magnetic read/write head, of a given type movable by an actuator in a width direction (y) with respect to the longitudinal direction (x) of the magnetic tape, said magnetic read/write head having a plurality of read/write units, wherein,
- during cooperation with said magnetic read/write head of the given type, amplitudes of the servo signals read by the read/write units, as a function of the position in the width direction (y) of the magnetic read/write head with respect to the magnetic tape, are substantially the same for all the read/write units of the read/write head; and
- each servo track in its totality consists of a set of sub-tracks comprising signal-carrying sub-tracks and empty sub-track,
a signal-carrying sub-track extending in the longitudinal direction (x) of the magnetic tape and having a constant width in the width direction (y) of the magnetic tape,
an empty sub-track having a constant width and directly adjoining at least one signal-carrying track and extending in the same direction,
a servo signal of the same amplitude and phase being present in each of the signal-carrying sub-tracks, and
each of the empty sub-tracks being substantially free from a servo signal.

7. The magnetic tape as claimed in claim 6, wherein
each buried servo track of greater width contains a servo signal having an effective value adapted to read/write characteristics of the read/write units of said read/write head and to the effective value of the servo signal in the servo tracks of the width w1.

8. The magnetic tape as claimed in claim 6, wherein
the first and second type servo signals substantially consist of sinusoidal signals of the same frequency but of opposite phase; and
the first and second type servo signals having amplitudes substantially equal to one another.

9. A cassette having a housing which accommodates a take-up reel hub with a magnetic tape wound on it, wherein the magnetic tape is provided with a pattern of buried servo tracks, and comprises:
- buried servo tracks of a first type containing a first servo signal, and
- buried servo tracks of a second type containing a second servo signal,
- said buried servo tracks extending substantially in a longitudinal direction (x) of the magnetic tape, a track pattern of said buried servo tracks, in a transverse direction (y) perpendicular to the longitudinal direction (x), alternately comprising a buried servo track of the first type and a buried servo track of the second type, said buried servo tracks including at least one group of buried servo tracks having a width w1 and at least one buried servo track of a greater width, said magnetic tape cooperating with a magnetic read/write head, of a given type movable by an actuator in a width direction (y) with respect to the are longitudinal direction (x) of the magnetic tape, said magnetic read/write head having a plurality of read/write units, wherein, during cooperation with said magnetic read/write head of the given type, amplitudes of the servo signals read by the read/write units, as a function of the position in the width direction (y) of the magnetic read/write head with respect to the magnetic tape, are substantially the same for all the read/write units of the read/write head; and
- each servo tracks in its totality consists of a set of sub-tracks comprising signal-carrying sub-tracks and empty sub-track, a signal-carrying sub-track extending in the longitudinal direction (x) of the magnetic tape and having a constant width in the width direction (y) of the magnetic tape, an empty sub-track having a constant width and directly adjoining at least one signal-carrying track and extending in the same direction, a servo signal of the same amplitude and phase being present in each of the signal-carrying sub-tracks, and each of the empty sub-tracks being substantially free from a servo signal.

10. An arrangement for formatting a magnetic tape, including a magnetic write head and means for scanning a magnetic tape by the magnetic write head, wherein the magnetic write head comprises:

- a head face having a longitudinal direction (x) corresponding to a longitudinal direction of movement of the magnetic tape with respect to the write head, and a width direction (y) perpendicular to the longitudinal direction and extending parallel to a generatrix of the head face; and;
- a structure of integrated write units provided in the write head,
- the write units being juxtaposed and extending in the width direction (y),
- each of the write units having at least one write gap terminating in the head face and having a dimension in the width direction corresponding to the width of the corresponding servo track, and
- said write units including at least one group of juxtapose write units of a width w1 and at least one write unit of greater width, said at least one write unit of a greater width consisting of a set of write sub-units with a spacing between each pair of adjacent write sub-units, each write sub-unit having the width of a signal-carrying sub-track and the spacing having the width of an empty sub-track.

* * * * *